United States Patent
Hutchison

(10) Patent No.: US 9,411,558 B2
(45) Date of Patent: Aug. 9, 2016

(54) SYSTEMS AND METHODS FOR PARALLELIZATION OF PROGRAM CODE, INTERACTIVE DATA VISUALIZATION, AND GRAPHICALLY-AUGMENTED CODE EDITING

(71) Applicant: Luke Hutchison, Palo Alto, CA (US)

(72) Inventor: Luke Hutchison, Palo Alto, CA (US)

(*) Notice: Subject to any disclaimer, the term of this patent is extended or adjusted under 35 U.S.C. 154(b) by 0 days.

(21) Appl. No.: 14/059,353

(22) Filed: Oct. 21, 2013

(65) Prior Publication Data

US 2014/0115560 A1 Apr. 24, 2014

Related U.S. Application Data

(60) Provisional application No. 61/716,529, filed on Oct. 20, 2012.

(51) Int. Cl.
G06F 9/45 (2006.01)
G06F 9/44 (2006.01)

(52) U.S. Cl.
CPC ........ *G06F 8/34* (2013.01); *G06F 8/451* (2013.01); *G06F 8/433* (2013.01)

(58) Field of Classification Search
CPC ............ G06F 8/433; G06F 8/34; G06F 8/451
USPC ........................................................ 717/113
See application file for complete search history.

(56) References Cited

U.S. PATENT DOCUMENTS

| | | |
|---|---|---|
| 5,704,053 A | 12/1997 | Santhanam |
| 6,128,773 A | 10/2000 | Snider |
| 2003/0221121 A1 | 11/2003 | Chow |
| 2009/0113185 A1 | 4/2009 | Hansen et al. |
| 2010/0199257 A1 | 8/2010 | Biggerstaff |
| 2011/0161912 A1* | 6/2011 | Eteminan et al. ............. 717/101 |
| 2012/0324141 A1 | 12/2012 | Seong et al. |
| 2013/0159981 A1 | 6/2013 | Klemenz et al. |

OTHER PUBLICATIONS

Brett Victor, "Inventing on Principle," https://vimeo.com/36579366. Feb. 10, 2012.
Chris Granger, "Light Box," http://www.kickstarter.com/projects/ibdknox/light-table. Apr. 17, 2012.
Luke Hutchison, "Solving the Multicore Dilemma," http://www.flowlang.net/p/solving-multicore-dilemma.html. Mar. 10, 2012.
Luke Hutchison, "The Flow Manifesto," http://www.flowlang.net/p/flow-manifesto.html. Nov. 15, 2010.

(Continued)

*Primary Examiner* — John Chavis
(74) *Attorney, Agent, or Firm* — Paul Roberts, Esq

(57) ABSTRACT

A system for providing a computer configured to read an immutable value for a variable; read the value of the variable at a specific timestamp, thereby providing an ability to create looping constructs; set a current or next value of a loop variable as a function of previous or current loop variable values; read a set of all values that a variable will assume; push or scattering the values into unordered collections; and reduce the collections into a single value.

16 Claims, 5 Drawing Sheets

(56) References Cited

OTHER PUBLICATIONS

PCT/US14/61440, Written Opinion of the ISA, filed Oct. 21, 2014.
Toda, T. et al. 'Parallel, Distributed, and Differential Processing System for Human Activity 41 Sensing Flows', Session: International Workshop on Human Activity Sensing Corpus and Its Application (HASCA2013), UbiComp'12, Sep. 8-12, 2013, Zurich, Switzerland; Publication [online]. Sep. 2013 [retrieved Feb. 18, 2015]. Retrieved from the Internet <URL: http://www.ubicomp.org/ubicomp2013/adjunctladjunct/p689.pdf>: pp. 689-699.

* cited by examiner

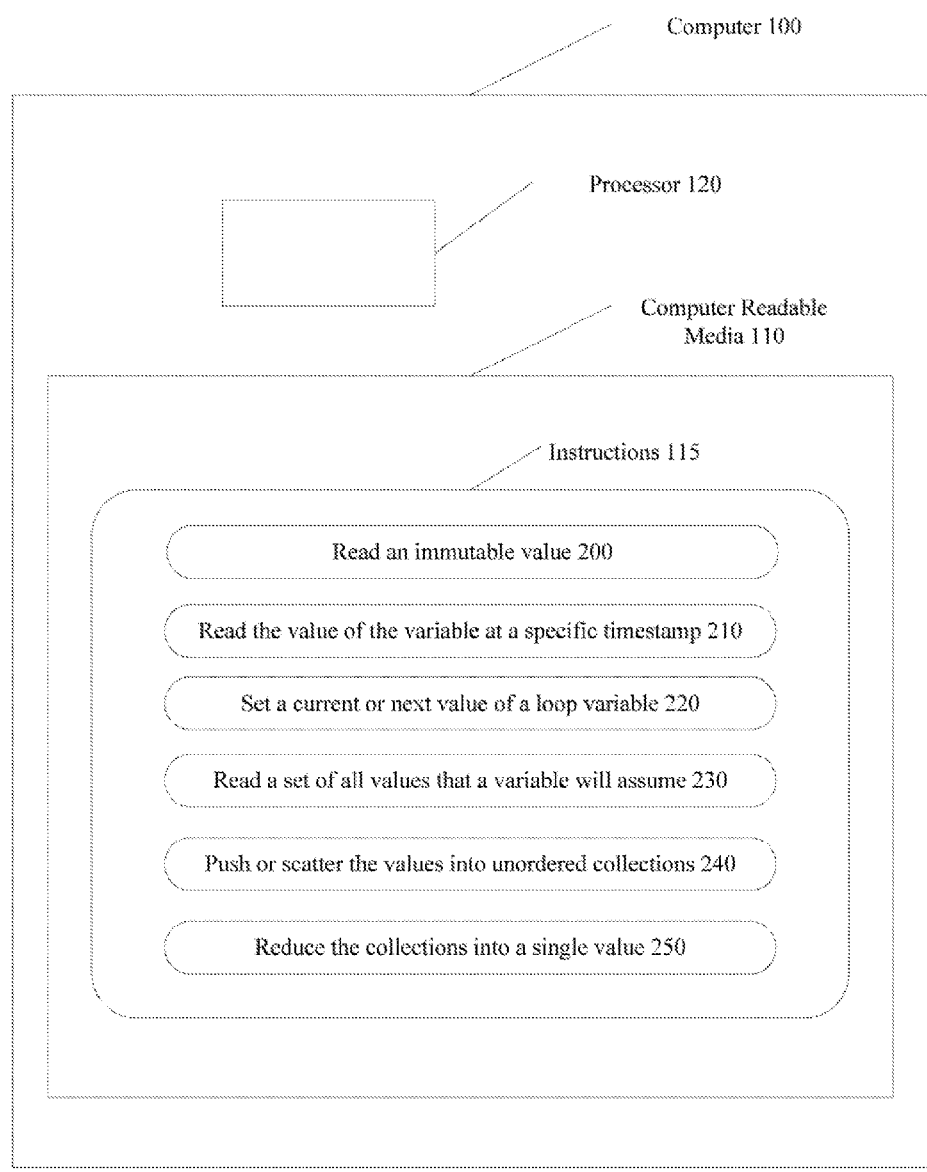

SYSTEMS AND METHODS FOR PARALLELIZATION OF PROGRAM CODE, INTERACTIVE DATA VISUALIZATION, AND GRAPHICALLY-AUGMENTED CODE EDITING

CROSS REFERENCES

This application claims the benefit of priority to U.S. Provisional Application 61/716,529 filed Oct. 20, 2012, the contents of which are incorporated by reference in its entirety.

BACKGROUND

A number of systems exist for construction of parallel computing DAGs, e.g. Apache Pig, Intel Threaded Building Blocks, and Twitter Storm. The key difference here is the insight of how to map DAG construction onto program language syntax, so that DAG construction is completely automatic, to produce the optimal DAG construction possible, and so that invalid DAGs cannot be constructed. By building this as a language, the compiler is free to parallelize or optimize at any scale, from fine-grained to coarse-grained, and there is no library boilerplate code to write. In the described system, DAG edges represent data dependencies, not communications specifically, but the compiler is free to turn them into communications if needed.

The proposed system is similar to, but different from, continuation passing style (CPS) and single static assignment (SSA). There is less boilerplate code than with CPS, and SSA gives no guarantees in the case of pointer aliasing, although much prior research into SSA may be useful in building a compiler for various type of programming such as in techniques described below. Neither CPS nor SSA gives suggestions about how to optimally map that paradigm onto programming language syntax or semantics to give guarantees about parallelizability.

A number of methods have arisen to create MapReduce pipelines, e.g. JavaFlume (which does profile-guided optimization to move mappers and reducers onto the same machine where possible). Our approach of enforcing linguistic constraints that guarantee the opportunity to perform powerful static analyses mean that we can make more optimal decisions about what to turn into a MapReduce operation in the first place, and what not to (i.e. in the described system, as much native-style computation as possible is performed within each node, and as little communication as possible is sent between nodes). Furthermore, by tracking the algebraic properties of functions, we enable code transformations that are not possible in a pipeline of hard-coded MapReduce operations, e.g. the use of partial reducers and mapper-reducer fusion Various graphical programming tools have been developed (e.g. LabView), but rely on a "flowcharting" approach to programming, which neither respect the constraints of the lattice-based programming paradigm, nor work with how the brain prefers to work with program code. https://vimeo.com/36579366—Brett Victor, "Inventing on Principle". Shares some ideas of realtime evaluation of code as it is being edited, but does not give a graphical representation of data dependencies of code. http://www.kickstarter.com/projects/ibdknox/light-table—Light Table IDE. Shares some ideas of realtime feedback and display of values flowing through functions, but displays intermediate values as substituted into the code, rather than displaying the data dependency graph graphically next to the code with pop-up visualizers. In particular, the programmer needs to compare two versions of the code side-by-side, one with values substituted.

SUMMARY

A computer comprising tangible computer readable storage media and a processor, the storage media comprises instructions to cause the processor to: read an immutable value for a variable; read the value of the variable at a specific timestamp, thereby providing an ability to create looping constructs; set a current or next value of a loop variable as a function of previous or current loop variable values; read a set of all values that a variable will assume; push or scattering the values into unordered collections; and reduce the collections into a single value. The pushing or scattering operation may comprise pushing values into bins based on a key. The collections may comprise a type, and the storage media provides a type system to constrain the type of any collections that are recipients of push operations to be unordered. Fold or reduce operations applied to those collections may require the collections to be unordered. The scatter operation may configured to directly support, and may be mapped into a map reduce-style computation.

The computer may be configured such that it stores data and instructions in different or separate memory locations or structures. E.g. data may be stored in an external server comprising a database, and instructions may be copied into volatile memory from a local hard drive in the computer.

Some of the features of the instructions help ensure that all writing may be scheduled to run before any reading (e.g. there should only ever be one writer and no readers, or zero writers and any number of readers of a given value, and the compiler should ensure that no value can be read before it is written). Syntactically guaranteeing this makes it possible to guarantee that the data dependency graph can be reasoned about at compiletime, and makes it possible for the compiler to determine if the data dependency graph is a DAG or not. The listed sub-clauses are a means of accomplishing this end goal, but this is not necessarily an exhaustive list.

A timestamp may be a local timestamp or version number. For example: this may be a purely algebraic or symbolic version number that the compiler may reason about, using some abstract symbol or formula, referring to the current loop index or some previous or next index, as opposed to a specific numbered version. Pushing or scattering may comprise pushing or scattering a set of values into one or more collections, possibly according to a key associated with each value. Reducing the collections may reduce a collection to a single value by applying a reduce or fold function to the elements of the collection, optionally including automatically converting the fold function into a parallel fold function if the function is known to be commutative and/or associative. A push operation may require the resulting collection to be unordered, so that elements can be processed in an indeterminate order. Folding or reducing does not require the collections to be unordered, but if they are in an unknown order, some configurations may require the fold or reduce function be configured to handle elements in an indeterminate order and still generate the same result, so the fold or reduce function must be commutative. For a push or scatter operation, the compiler may be configured to generate the appropriate communication and/or synchronization logic automatically so that different parallel computing units may concurrently push values into collections with matching keys. The communication part may include memory references or network communication. The synchronization part may be accomplished using locking, some lock-free data structure, or by each computing element creating its own set of buckets that contain the values it personally produces, followed by a single locking merge step at the end to merge all the individual bucket instances together for each unique key, in order to reduce intermediate lock contention.

A computer comprising tangible computer readable storage media and a processor, the storage media comprises instructions to cause the processor to: provide an integrated development environment; the environment comprising: a textual editor for a lattice-based programming language; the textual editor configured to show program source code of a program; a display for showing a data dependency lattice of the program to the side of the program source code; a plurality of nodes in the lattice corresponding to a vertical position in each line or expression in the program; and a node manipulator configured to allow a node to be dragged up or down, causing programming lines in the program to be reordered. Data dependencies may defined by specifying that the edges in the lattice are directed edges, showing which values or collections of values are used to produce which other values or collections of values.

A node visualizer may be configured to: allow the data produced by the line or expression corresponding to a given node to be visualized using some graphical or textual data visualization method appropriate for the data type of the node; interface with the storage media to cache values or collections of values produced at each node, allowing for partial recomputation of subsets of a program's DAG based on previously-computed values; trigger a partial re-compile of a subset of a program's DAG; trigger a partial re-compute of a program's cached values that lie at or downstream from changed lines or expressions in the program, by finding the nodes in the program DAG that lie downstream of the node corresponding to the changed line or expression; and provide an interface for the user to edit a program and have the result value or collection for each changed line or expression recomputed immediately, followed by updating the accompanying visualization for the corresponding node in the program DAG, and beginning a recompute of any downstream data dependencies in the DAG, enabling realtime fusion of programming, program execution and data visualization by means of partial evaluation, using the mechanisms described above.

BRIEF DESCRIPTION

Figure 2:
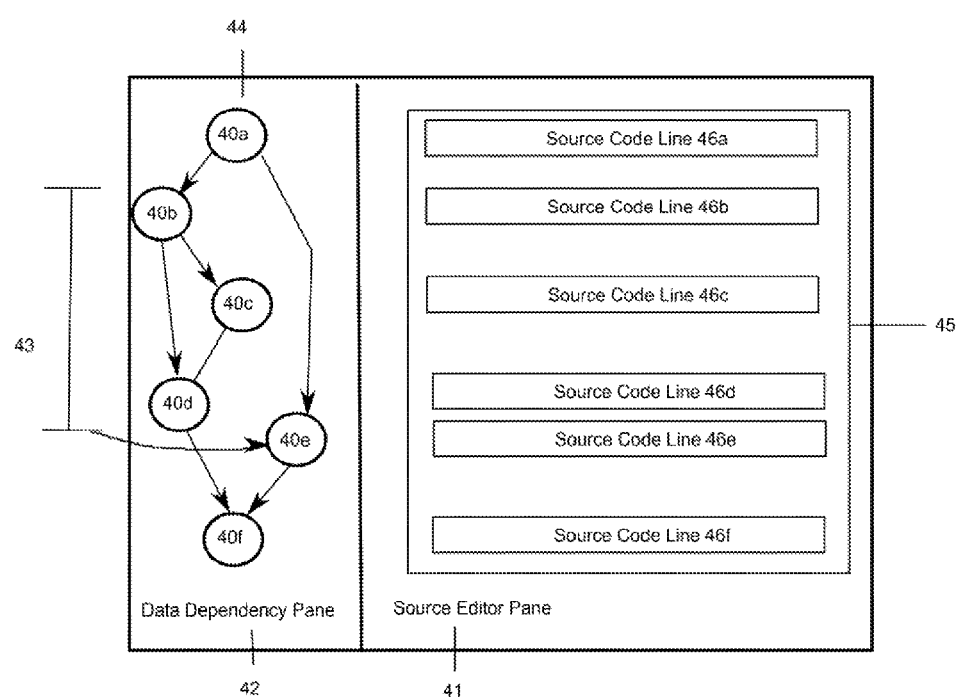

FIG. 2 comprises a schematic of an integrated desktop environment.

FIG. 3 illustrates a computer comprising a processor and computer readable media. comprising a plurality of instructions.

DETAILED DESCRIPTION

Programming language constraints to allow automatic parallelization.

As shown in FIG. 3. A computer (100) comprising tangible computer readable storage media (110) and a processor (120), the storage media comprises instructions (115) to cause the processor to: read an immutable value for a variable (200); read the value of the variable at a specific timestamp, thereby providing an ability to create looping constructs (210); set a current or next value of a loop variable as a function of previous or current loop variable values (220): read a. set of all values that a. variable will assume (230); push or scatter the values into unordered collections (240); and reduce the collections into a single value (250). The pushing or scattering operation may comprise pushing values into bins based on a key. The collections may comprise a type, and the storage media provides a type system to constrain the type of any collections that are recipients of push operations to be unordered. Fold or reduce operations applied to those collections may require the collections to be unordered. The scatter operation may configured to directly support, and may be mapped into a MapReduce-style computation.

Take any imperative programming language as a starting point, and remove the capability to read the current value of a variable from that language. Replace that capability with: a) The ability to read the only value that a variable will ever take on (immutability). =>This yields pure functional programming; b) The ability to read the value of a variable at a specific timestamp (recurrence relations).=>This restores the ability to create looping constructs in the language, 140 because the current or next value of loop variables can be set as functions of previous or current loop variable values respectively, e.g. $x'=x+1$, or $x[t]=x[t-1]+1$; c) The ability to read the set of all values that a variable will ever take on (push/scatter). =>This gives the language the ability to push or scatter values into unordered collections, e.g. to push values into bins based on some key, e.g. 1→counts[key]. These collections may then be reduced to produce a single value. =>This feature directly enables a large subset of imperative-style programming, with the caveat that all writers must complete their writing and the collection must be finalized before any readers begin to read. Furthermore, the type system must constrain the type of any collections that are recipients of push operations to be unordered, and any fold or reduce operations applied to those collections must assume the collections are unordered (and therefore the function being applied to reduce the collection must be commutative). The scatter operation also directly supports, and may be mapped onto, MapReduce-style computation, since it is equivalent to the shuffle step in MapReduce.

Figure 1A:
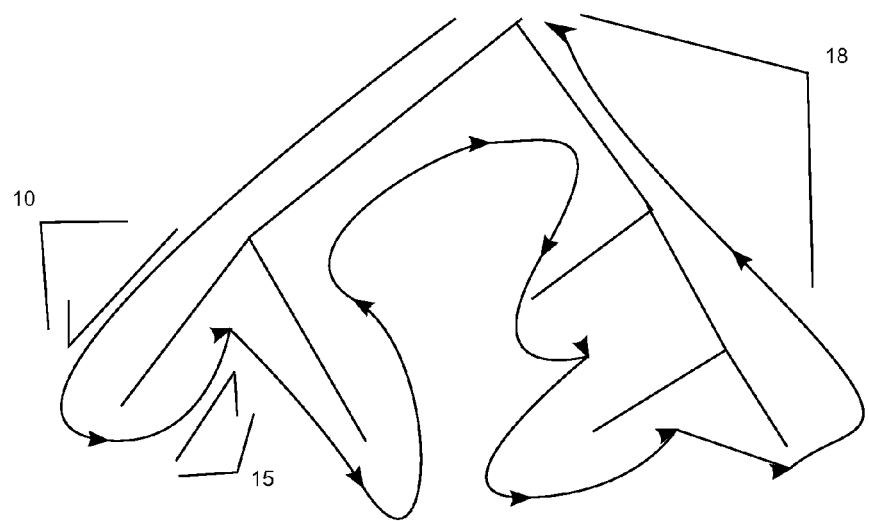
FIG. 1A is a schematic illustration of functional programming.
Figure 1B:
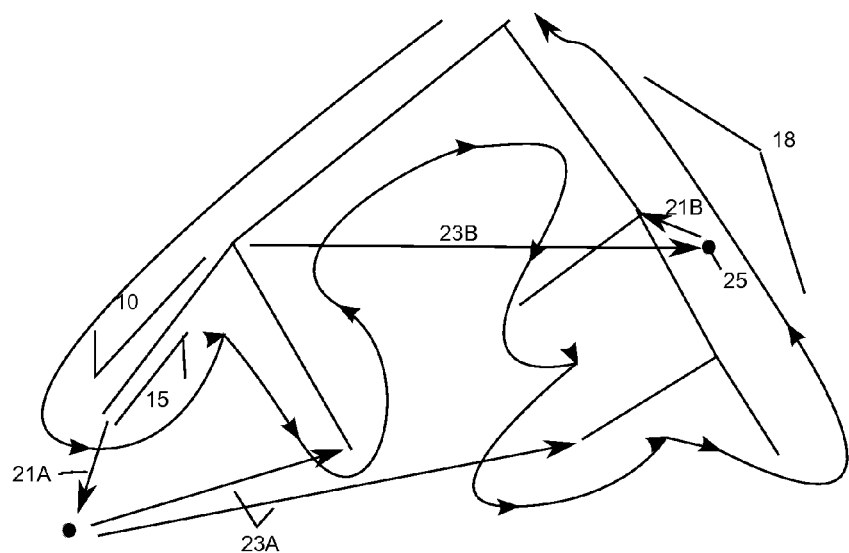
FIG. 1B is a schematic illustration of imperative programming.
Figure 1C:
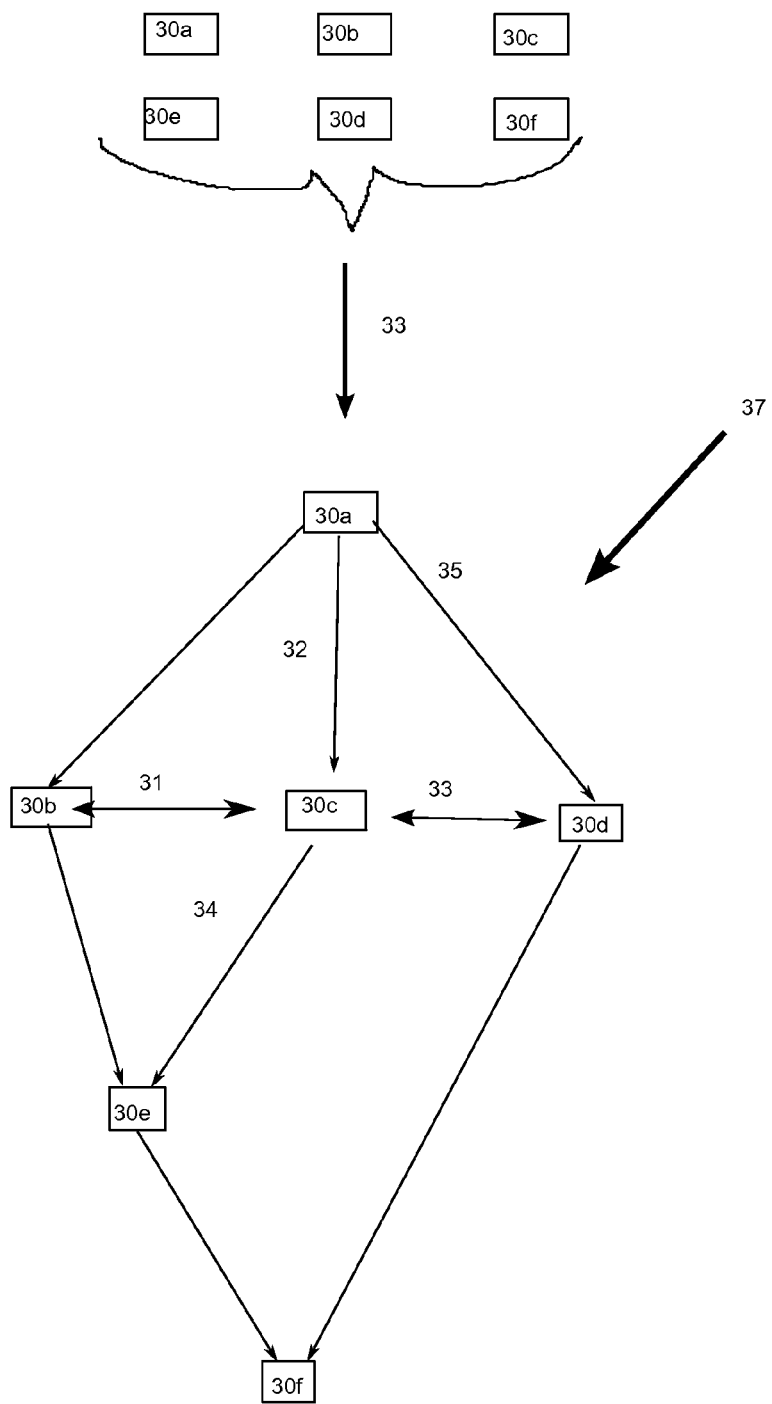
FIG. 1C is a schematic illustration of lattice-based programming.

Collectively, the previously described method helps ensure that (i) the data dependency graph of any valid program may be statically determinable, and (ii) the compiler may verify whether the data dependency graph is a Directed Acyclic Graph (DAG) (FIG. 1C, in contrast to the recursive call tree of both functional and imperative languages (FIG. 1A and FIG. 1B), optionally augmented with the ability to read or write external state in imperative languages (FIG. 1B).

FIG. 1A shows a functional programming module. Element 10 illustrates parameter values, element 15 illustrates return values, and element 18 illustrative a recursive call tree. FIG. 1B 160 shows an imperative programming module. Element 20 illustrates parameter modules, element 25 illustrates return values, and element 28 illustrates an external state. A first write function 21A, second write function 21B, first read function 23A, and second read function 23B are shown. Element 25 shows an external state.

FIG. 1C illustrates a lattice-based programming module. Function $30a$=File("x.csv"), 165 function $30b$=f($30a$), function $30c$=g($30a$), function $30e$=h($30b$, $30c$), function $30d$=p($30a$), and function $30f$=q($30e$, $30d$). After a compile 33 operation, elements $30a$, $30b$, $30c$, $30d$, $30e$, and $30f$ are transformed into mapping 37. Symbolically, elements $30a$, $30b$, $30c$, $30d$, $30e$, and $30f$ may be written as a, b, c, d, e, and f respectively. In graph 37, process 31=f( ), process 32=g( ), process 33=q( ), process 34=( ), and process 35=p( ). Processes 31 and 33 may be executed in parallel.

The DAG is a partial ordering, since the arcs in the data dependency graph follow the arrow of time: a value must be produced before it can be read/all writers are always scheduled to run before any and all readers of any value or collection. The partial ordering is a lattice if all inputs and constant values are connected to an "input state" least upper bound and all outputs are connected to an "output state" greatest lower bound. The possibility of race conditions and deadlocks is eliminated in this formulation, by definition of the properties of a DAG. The compiler is free to parallelize the code in any manner consistent with the partial ordering of operations in the data dependency graph, including running in parallel any two nodes that do not have a directed path between them, as well as pipelining operations that are connected by a directed path.

The method also helps ensure that the compiler can generate reference counting code automatically, ensuring that the programmer does not need to manually allocate or free memory, and that there is no need for garbage collection: memory is allocated for a node's "bottom half" (the value or collection of values) once all its dependencies have been computed and are available, and memory for the node is freed once all the downstream dependencies have read from this node. This eliminates the possibility of many memory-related programmer errors, e.g. segmentation faults, dangling pointers, etc.

Computational Model and Method of Parallelization

Each node in a program lattice may comprise a "top half", an expression, and a "bottom half", a value or collection of values (FIG. 1C). Nodes may be connected to other nodes with arcs or dependency edges. a) Edges specifically represent data dependencies, although they may be turned into lookup operations or data communications by the compiler. b) The Big-Oh time complexity of the top half and the Big-Oh space complexity of the bottom half may be estimated as a function of input data sizes and values. The compiler may have several backends targeting different parallelization architectures, with a Big-Oh cost profile for each elemental computation, synchronization type, lookup operation and communication, and this profile is used to choose between different parallelization strategies for a given target architecture (code may be parallelized differently depending on the target architecture). c) Examples of target architectures that should be supportable with this system include, but are not limited to, pthreads for shared memory multicore machines, CUDA or similar for GPU computation, Hadoop or MapReduce for cluster computing, Javascript WebWorker threads for parallelization in the browser, and Verilog/VHDL for compiling straight to FPGA hardware.

A slicer will take a program lattice and a Big-Oh profile for the target architecture, and will produce a parallelization plan, effectively splitting the lattice into sub-lattices that will run on each node. Edges within a node's sub-lattice will be turned into data lookups, edges between two nodes' sub-lattices will be turned into communications. a) The compiler may make optimization tradeoffs either at compile-time, or may emit code that can switch between different algorithms at runtime based on input data sizes or data values. b) The optimization step will choose between not just alternative parallelization strategies (including serial vs. parallel implementations), but also different equivalent data structures with different per-operation Big-Oh complexity profiles (e.g. a linked list vs. an ArrayList). c) The slicer may also be used to produce optimal client/server code, automatically figuring out which code should run in the client and which code should run in the server in order to move computation as close as possible to the data it depends upon, and to minimize network communication. The slicer effectively chooses an API boundary and generates the API and all RPC code automatically.

Any sub-lattice may be thought of as a morphism (from category theory), effectively a mapping from a domain to a range. Function evaluations and map lookups may be treated the same way. a) The compiler should track, wherever possible, the domain and range of each morphism and sub-morphism within the program. b) Morphisms may be completely or partially evaluated if values are available statically, and/or if the size of any morphism's domain is small. This allows some of the burden of running the code to be offloaded from the runtime to the compiler, so that the compiler produces "lookup tables", effectively collapsing down a morphism like an accordion into a flat map lookup. The user can "turn a knob" to tradeoff between runtime efficiency and the size of the generated binary/the time required to compile it. c) Iteration is an unfolding of multiple copies of a morphism until termination, with the next values of loop iteration variables in the range of one copy of the morphism connected to the current value of the corresponding loop iteration variables in the domain of the next copy of the morphism. Recursion is the nesting or morphisms inside morphisms, expanding until termination.

As well as tracking the domains and ranges of morphisms (where possible), and the orderdness of collections, the compiler should track the algebraic properties of functions (associativity, commutativity, idempotence etc., but not limited to these properties). This will allow the compiler to know when it safely has the freedom to split and reorder operations. a) Associativity/commutativity can be tracked by either partially evaluating the function across all domain values, if its domain is small and its runtime is not large, or by expanding and canceling like terms in $f(f(a, b), c)==f(a, f(b, c))$ and $f(x, y)==f(y, x)$ respectively (relying on the known associative and commutative properties of built-in functions as base cases for recursion). It is probably uncomputable in the general case to check associativity and commutativity, but these two methods should suffice for a large range of possible functions. b) Tracking the algebraic properties of functions is particularly useful in the case of constructing reducers or performing fold operations, because (1) the result of a push or scatter operation (as described in step c of the section describing programming language constraints to allow automatic parallelization) can only be reduced by a commutative function, and (2) the compiler may render the inherently serial reduce operation into an inherently parallel divide-and-conquer parallel fold operation if the function is associative. c) Once a reducer has been determined to be associative, or commutative (=associative and commutative), and can therefore be implemented as a parallel fold, the compiler can automatically turn the reducer into a partial reducer and/or implement mapper-reducer fusion.

i) Partial reducers: Any given reducer can be split across as many computational nodes as desired (with their partial results combined at the end), and any one of those given partial reducers can handle partial reduction of an arbitrary number of keys. This solves the long-standing problem of properly load-balancing MapReduce jobs when the distribution of number of values across the reducer keyspace is non-uniform.

ii) Mapper-reducer fusion: In fact, these partial reducers may be moved into the same node as the mappers, using a local HashMap or similar for O(1) in-memory lookup, eliminating the shuffle step for all but the partially-reduced values from each of the partial reducers, dramatically eliminating how much data must be sent over the network. This eliminates a major bottleneck in MapReduce. It is pointless sending the output of the mappers over the network when, in many cases, a large number of key-value pairs will be very simply collapsed down into a single key-value pair by the reducer. With mapper-reducer fusion, using partial reducers, only one key-value pair per partial reducer is sent over the network to the final reducer, as opposed to in many cases billions of mapper outputs per key.

Tracking idempotence will yield provable guarantees on fault tolerance, because it will be possible to determine what code can be restarted from scratch with no deleterious effect.

Realtime Collaborative IDE and Data Visualization Workbench for the Described Language Building big data pipelines in exploratory or prototyping mode is a painstaking process, since often every time the code needs to be tweaked, the entire data pipeline needs to be left to run for another week. It may be difficult to analyze internal values computed within a big data pipeline, the values usually need to be "tapped off" by adding temporary code to the program to output a set of values to a file, which is then manually examined by the programmer to try to debug the program. The serial ordering of lines in a program's source code is largely artificial, requiring the programmer to "perform a topological sort in their head of the data dependencies in the program" (the programmer has to compute values higher up in a scope that will be used further down in the scope, but there is usually some freedom to reorder lines with no effect on the output of the program). Graphical and dataflow/flow-based programming languages have tried many different visual programming paradigms, none of which have achieved wide traction, because it is harder for the human brain to comprehend a program in graphical form than in textual form, in spite of the vastly powerful and visually-oriented capabilities of the visual cortex. An Integrated Development Environment (IDE) is described that provides a textual editor for a lattice-based programming language. The IDE may be augmented by a graphical view of the program lattice. The data dependency lattice of the program 44 is displayed to one side of the program source code 45. One node in the lattice corresponds to, and is displayed at the same vertical position as, each line (46a-46f) or expression in the program. The graph may be laid out in a variety of different ways, but displays a lattice. Nodes (40a-40f) in the program may be dragged up or down to reorder lines in the program 43. Nodes may be dragged as far as is possible while still yielding a valid program, i.e. they may be dragged up as far as the line beneath any upstream data dependencies, or down as far as the line above any downstream data dependencies.

The IDE may run the code as it is being edited. The values computed at some or all nodes in the program lattice may be cached, and the programmer may click on a node to pop up a customizable visualization of data computed at that node 40A-40F. The IDE may support incremental evaluation, so that when an expression is changed, only the intermediate values computed for that expression and downstream data dependencies need be recomputed in the source editor pane.

The source editor pane 41 may be a collaborative editor with built-in version control. The data dependency pane 42 may have one node per line, representing the value or collection of values generated by the corresponding sourcecode expression. Element 43 illustrates that dragging a node up (to just below its lowest upstream dependency) or down (to just above it highest downstream dependency) to reorder lines of code. As shown in element 44, clicking on a node in the graph will pop up a pluggable visualization of data as it flows through that node (scatterplot, bar graph, spreadsheet view, etc.). Source code 45, such as, a=File("x.csv"), b=f(a), c=g (a), e=h(b, c), d=p(a), and f=q(e, d), may be edited on any line, and only the downstream data dependencies would be recalculated (40c, 40e, and 40f). =>incremental evaluation: realtime editing of program as data flows through the pipelines.

This hybrid source view, augmented with a graphical display of the program lattice, allows programmers to work on text-based source code as normal, while being shown the data dependencies in the program directly in graphical form. This will add to, rather than detract from, the ability of the brain to reason about the program. Incremental evaluation, with caching (memoization) of intermediate values, and built-in visualization capabilities, will allow the programmer to easily see the effect their changes have on the data, giving a much more hands-on approach to developing data manipulation pipelines. In particular, reducing the latency of the write-run-debug feedback loop for the programmer to almost zero will have a dramatic effect on programmer productivity.

The invention claimed is:

1. A computer comprising non-transitory computer readable storage media and a processor, the storage media comprises instructions to cause the processor to: read an immutable value for a variable; read the value of the variable at a specific timestamp, thereby providing, an ability to create looping constructs; set a current or next value of a loop variable as a function of previous or current loop variable values; read a set of all values that a variable will assume; push or scatter the values into unordered collections; and reduce the collections into a single value.

2. The computer of claim 1, wherein the push or scatter instruction comprises pushing values into bins based on a key.

3. The computer of claim 1, wherein the collections comprise a type, and the storage media provides a type system to constrain the type of any collections that are recipients of push operations to be unordered.

4. The computer of claim 3, wherein any fold or reduce operations applied to those collections requires the collections to be unordered.

5. The computer of claim 3, comprising a scatter operation configured to directly map into a MapReduce-style computation.

6. The computer of claim 1 wherein the instruction to push or scatter the values into unordered collections further comprises instructing the processor to push or scatter the values into one more collections according to a key associated with each value.

7. The computer of claim 1 wherein the processor is configured to generate appropriate communication logic so that different parallel computing units may concurrently push values into collections with matching keys.

8. The computer of claim 1 comprising an instruction to generate a slicer configured to take a program lattice and a Big-Oh profile for a target architecture to product a parallelization plan that splits the lattice into sub-lattices that will run on each node.

9. The computer of claim 1 comprising an instruction to:
generate reference counting code automatically to ensure that a programmer does not need to manually allocate or free memory;
allocate memory for a node once all of the node's dependencies have been computed and are available; and
free the memory for the node once all downstream dependencies have been read from the node.

10. A computer comprising non-transitory computer readable storage media and a processor, the storage media comprises instructions to cause the processor to:

provide an integrated development environment; the: environment comprising:

a textual editor for a lattice-based programming language; the textual editor configured to show program source code of a program;

a display for showing a data dependency lattice of the program to the side of the program source code;

a plurality of nodes in the lattice corresponding to a vertical position of each line or expression in the program; wherein one node in the lattice corresponds to, and is displayed at the same the vertical position as, each line or expression in the program, and a node manipulator configured to allow a node be dragged up or down, causing programming lines in, the program to be reordered.

11. The computer of claim 10, wherein the display is configured to provide an editing interface for a user.

12. The computer of claim 10, wherein the nodes are draggable up as far as a line beneath any upstream data dependency or down as far as a line above any downstream data dependency.

13. The computer of claim 10, wherein the integrated desktop environment supports incremental evaluation, wherein only intermediate values computed for an expression and downstream data dependencies need to be recomputed when an expression is changed.

14. The computer of claim 10, wherein the nodes are connected other nodes with dependency edges, wherein the dependency edges represent data dependencies.

15. The computer of claim 10, wherein the processor changes the edges into lookup operations.

16. The computer of claim 14, wherein the processor changes the edges into data communications.

* * * * *